US011560941B1

(12) United States Patent
Wurst et al.

(10) Patent No.: US 11,560,941 B1
(45) Date of Patent: Jan. 24, 2023

(54) REACTION PLATE WITH AN UNEVEN NUMBER OF TABS IN DRIVE AND COAST

(71) Applicant: SCHAEFFLER TECHNOLOGIES AG & CO. KG, Herzogenaurach (DE)

(72) Inventors: Nicholas Wurst, Akron, OH (US); Brian Zaugg, Millersburg, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 17/573,428

(22) Filed: Jan. 11, 2022

(51) Int. Cl.
*F16H 45/00* (2006.01)

(52) U.S. Cl.
CPC ....... *F16H 45/00* (2013.01); *F16H 2045/002* (2013.01)

(58) Field of Classification Search
CPC ....... F16H 2045/002; F16H 2045/0284; F16D 33/18; F16D 13/644; F16D 13/648
See application file for complete search history.

(56) References Cited

U.S. PATENT DOCUMENTS

| 2,174,240 | A | * | 9/1939 | Glenneythomas | F16D 13/69 192/70.28 |
| 2,738,864 | A | * | 3/1956 | Becker | F16D 25/0638 192/70.14 |
| 4,413,711 | A | * | 11/1983 | Lamarche | F16H 45/02 192/3.28 |
| 8,939,270 | B2 | * | 1/2015 | Dziurda | F16D 13/69 192/70.28 |
| 10,006,531 | B2 | * | 6/2018 | Yang | F16D 25/0635 |
| 10,145,458 | B2 | * | 12/2018 | Norwich | F16H 45/02 |
| 10,174,823 | B2 | * | 1/2019 | Kawahara | F16F 15/12353 |
| 2020/0386274 | A1 | * | 12/2020 | Usui | F16F 15/1232 |
| 2021/0140525 | A1 | | 5/2021 | Adams et al. | |

* cited by examiner

*Primary Examiner* — Huan Le

(57) ABSTRACT

A reaction plate suitable for use in a torque converter is disclosed. The reaction plate has a main plate area and a webbing area at the perimeter of the main plate area, wherein the webbing area is curved out of the plane of the main plate area. The reaction plate has two sizes of coupling windows. The wider windows have both a drive torque transfer tooth and a coast torque transfer tooth. The narrower windows have only a drive torque transfer tooth. This allows for more material to be present in the webbing area, increasing its durability or allowing the use of lighter or less expensive materials in the construction of the reaction plate.

20 Claims, 3 Drawing Sheets

REACTION PLATE WITH AN UNEVEN NUMBER OF TABS IN DRIVE AND COAST

TECHNICAL FIELD

The present disclosure relates to power transmission in automatic transmissions. More particularly, the present disclosure relates to the transfer of torque in a torque converter.

BACKGROUND

Conventionally in a torque converter, a piston has a plurality of torque transmission tabs coupled to a plurality of torque transmission tabs of an outer clutch plate via torque transmission teeth in a reaction plate. Typically, each pair of torque transmission tabs (one each from the piston and the outer clutch plate) are coupled together in a coupling window stamped into the webbing at the outer periphery of the reaction plate. Each window comprises two torque transmission teeth, one near each end of the coupling window. One of the two torque transmission teeth transmits drive torque in the drive direction, and the other one of the torque transmission teeth drives torque in the coast direction (opposite the drive direction).

In reaction plates with stamped coupling windows in the webbing at the plate periphery, there is a tradeoff between the number and size of windows and the material between them. The more coupling windows required, the less material is available in the webbing to maintain structural integrity. The conventional solution is to use more expensive or thicker materials. It is highly desirable to increase the amount of webbing material while maintaining the same torque transfer capability.

SUMMARY

A reaction plate suitable for use in a torque converter is disclosed. The reaction plate has a main plate area and a webbing area at the perimeter of the main plate area, wherein the webbing area is curved out of the plane of the main plate area. The reaction plate has two sizes of coupling windows. The wider windows have both a drive torque transfer tooth and a coast torque transfer tooth. The narrower windows have only a drive torque transfer tooth. This allows for more material to be present in the webbing area, increasing its durability or allowing the use of lighter or less expensive materials in the construction of the reaction plate.

In an exemplary embodiment, a torque converter comprises: a piston comprising a first plurality of torque transmission tabs, wherein; a first portion of the first plurality of torque transmission tabs is configured to transmit both drive torque and coast torque, and a second portion of the first plurality of torque transmission tabs is configured to transmit only drive torque; an outer clutch plate comprising a second plurality of torque transmission tabs, wherein: a first portion of the second plurality of torque transmission tabs is configured to transmit both drive torque and coast torque, and a second portion of the second plurality of torque transmission tabs is configured to transmit only drive torque; and a reaction plate coupling the piston to the outer clutch plate through the first plurality of torque transmission tabs and the second plurality of torque transmission tabs, wherein: the first portion of the first plurality of torque transmission tabs and the first portion of the second plurality of torque transmission tabs are coupled together in a first plurality of coupling windows in the reaction plate configured for the transmission of both drive torque and coast torque, and the second portion of the first plurality of torque transmission tabs and the second portion of the second plurality of torque transmission tabs are coupled together in a second plurality of coupling windows in the reaction plate configured for the transmission of only coast torque.

In another exemplary embodiment, the reaction plate further comprises torque transmission teeth in the first plurality of coupling windows and in the second plurality of coupling windows. In another exemplary embodiment, there is a first torque transmission tooth and a second torque transmission tooth in each of the first plurality of coupling windows, and one of the first portion of the first plurality of torque transmission tabs is coupled to one of the first portion of the second plurality of torque transmission tabs between the two torque transmission teeth in each of the first plurality of coupling windows. In another exemplary embodiment, there is a third transmission tooth in each of the second plurality of coupling windows, and one of the second portion of the first plurality of torque transmission tabs is coupled to one of the second portion of the second plurality of torque transmission tabs adjacent to the third transmission tooth in the second plurality of coupling windows.

In another exemplary embodiment, the first torque transmission tooth in each of the first plurality of coupling windows is a drive torque transmission tooth configured to transfer torque in a drive direction, the second torque transmission tooth in each of the first plurality of coupling windows is a coast torque transmission tooth configured to transfer torque in a coast direction that is opposite of the drive direction, and the third torque transmission tooth in each of the second plurality of coupling windows is a drive torque transmission tooth configured to transfer torque in the drive direction.

In another exemplary embodiment, each of the first plurality of coupling windows is a first width, each of the second plurality of coupling windows is a second width, and the first width is greater than the second width. In another exemplary embodiment, each of the first portion of the first plurality of torque transmission tabs is a third width, each of the first portion of the second plurality of torque transmission tabs is the third width, each of the second portion of the first plurality of torque transmission tabs is a fourth width, each of the second portion of the second plurality of torque transmission tabs is the fourth width, and the third width is greater than the fourth width. In another exemplary embodiment, the first plurality of coupling windows and the second plurality of coupling windows are arranged symmetrically around the periphery of the reaction plate. In another exemplary embodiment, the number of the first plurality of coupling windows is equal to the number of the second plurality of coupling windows, and the first plurality of coupling windows and the second plurality of coupling windows occur in alternate locations around the periphery of the webbing area.

In an exemplary embodiment, a reaction plate comprises: a main plate area; a webbing area at the perimeter of the main plate area, wherein the webbing area is curved out of the plane of the main plate area; a first plurality of coupling windows having a first width in the webbing area; and a second plurality of coupling windows having a second width in the webbing area.

In another exemplary embodiment, the first width is greater than the second width. In another exemplary embodiment, the first coupling windows each have a first torque transmission tooth and a second torque transmission tooth; and the second coupling windows each have a third torque transmission tooth. In another exemplary embodiment, the first torque transmission tooth in each of the first plurality of coupling windows is a drive torque transmission tooth configured to transfer torque in a drive direction, the second torque transmission tooth in each of the first plurality of coupling windows is a coast torque transmission tooth configured to transfer torque in a coast direction that is opposite of the drive direction, and the third torque transmission tooth in each of the second plurality of coupling windows is a drive torque transmission tooth configured to transfer torque in the drive direction.

In another exemplary embodiment, the first plurality of coupling windows and the second plurality of coupling windows are arranged symmetrically around the periphery of the webbing area. In another exemplary embodiment, the number of the first plurality of coupling windows is equal to the number of the second plurality of coupling windows. In another exemplary embodiment, the first plurality of coupling windows and the second plurality of coupling windows occur in alternate locations around the periphery of the webbing area. In another exemplary embodiment, the number of the first plurality of coupling windows is equal to eight and the number of the second plurality of coupling windows is equal to eight.

In an exemplary embodiment, a method of operating a torque converter comprises: transferring drive torque and coast torque between a piston comprising a first plurality of torque transmission tabs and an outer clutch plate comprising a second plurality of torque transmission tabs; coupling the first plurality of torque transmission tabs to the second plurality of torque transmission tabs via a first plurality of torque transmission teeth of a reaction plate and a second plurality of torque transmission teeth of the reaction plate; transferring only drive torque between the piston further comprising a third plurality of torque transmission tabs and the outer clutch plate further comprising a fourth plurality of torque transmission tabs; and coupling the third plurality of torque transmission tabs to the fourth plurality of torque transmission tabs via a third plurality of torque transmission teeth of the reaction plate.

In another exemplary embodiment, the reaction plate comprises a first plurality of coupling windows configured to transfer torque between the first plurality of torque transmission tabs and the second plurality of transmission tabs, the first plurality of coupling windows each comprise one of the first plurality of transmission teeth and one of the second plurality of transmission teeth, the reaction plate further comprises a second plurality of coupling windows configured to transfer torque between the third plurality of torque transmission tabs and the fourth plurality of transmission tabs, and the second plurality of coupling windows each comprises one of the third plurality of transmission teeth.

In another exemplary embodiment, drive torque is transmitted between the piston and the outer clutch plate via the first plurality of transmission teeth, coast torque is transmitted between the piston and the outer clutch plate via the second plurality of transmission teeth, and drive torque is transmitted between the piston and the outer clutch plate via the third plurality of transmission teeth.

BRIEF DESCRIPTION OF DRAWINGS

The above and other aspects, features, and advantages of several embodiments of the present disclosure will be more apparent from the following description presented in conjunction with the following several figures of the drawings.

Figure 1:
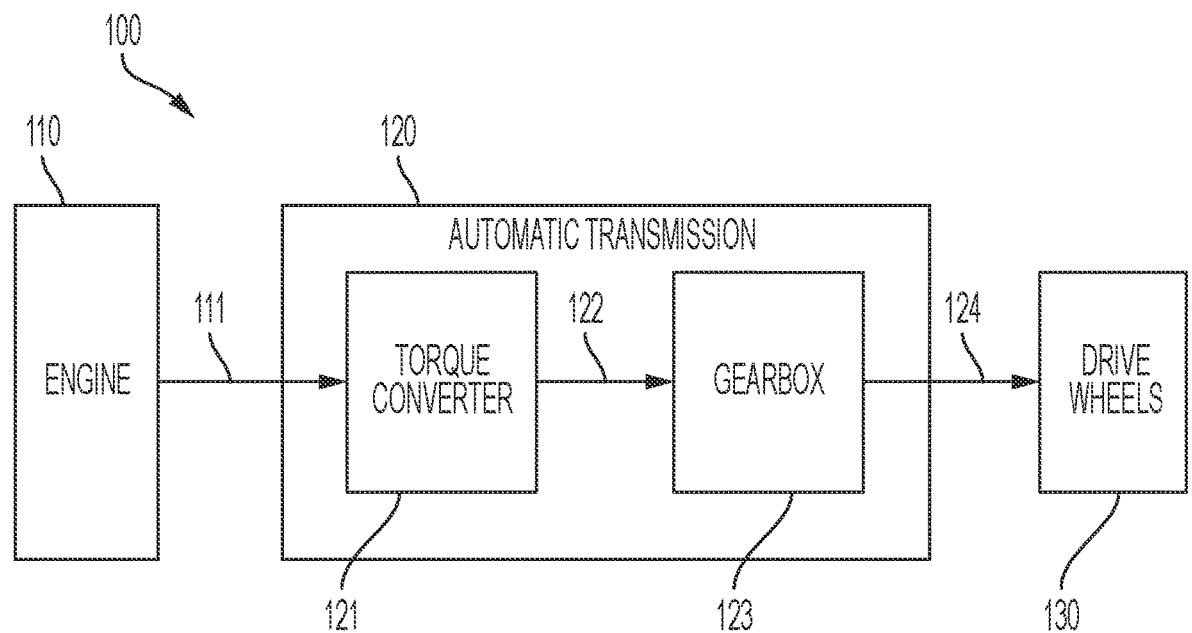
FIG. 1 is a conceptual block diagram of a drive train in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the situations described above, an improved reaction plate is disclosed. In a torque converter that operates in both drive and coast modes, the amount of torque transferred between the piston and the outer clutch plate via the reaction plate in each mode may be unequal. Typically, the amount of torque in the drive direction may be approximately twice the amount of torque in the coast direction. Thus, about half of the conventional torque transmission teeth in the coast direction may not be needed. By eliminating any unnecessary coast torque transmission teeth, the width of those windows may be narrowed. This may allow additional material to be present in the webbing, strengthening it, or, alternatively, this may allow the use of lighter or less expensive materials in the construction of the reaction plate. This approach may also allow the widths of the torque transmission tabs to be different in the two types of windows.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to flowchart diagrams and/or block diagrams and/or mechanical diagrams of methods, apparatuses, and systems, according to embodiments of the disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual block diagram of an automotive drive train in accordance with an embodiment of the disclosure is shown. Automotive drive train comprises engine 110 and automatic transmission 120 coupled together by the engine output shaft 111. Internal to automatic transmission 120, engine output shaft 111 is coupled to torque converter 121, which is in turn coupled to the gearbox 123 via intermediate shaft 122. Gearbox 123 is in turn coupled to the drive wheels 130 by transmission output shaft 124. Persons skilled in the art will appreciate that this is an exemplary drive train and that many other configurations exist. Such skilled persons will also appreciate that the inventive principles disclosed herein will apply to any such drive train comprising a torque converter.

Figure 2A:
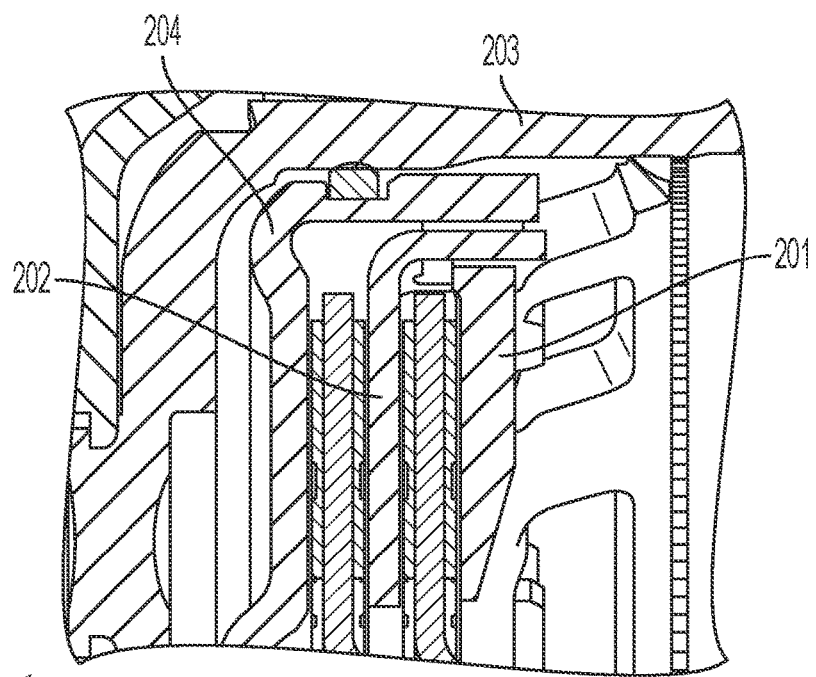
FIG. 2A is a mechanical diagram of a torque converter with a reaction plate in accordance with an embodiment of the disclosure.

Referring to FIG. 2A, a mechanical diagram of a torque converter with a reaction plate in accordance with an embodiment of the disclosure is shown. A portion of torque converter 200 is shown in cross-section and may comprise reaction plate 201, which may be coupled to torque converter cover 203 by means of a laser weld or some similar method. Also illustrated in the figure are piston 204 and outer clutch plate 202. Torque transmission tabs from piston 204 and outer clutch plate 202 extend into windows in reaction plate 201. There they engage with torque transmission teeth (not shown in FIG. 1) which extend from reaction plate 201 into the windows. This enables the mechanical connection transfer of torque between piston 204 and outer clutch plate 202.

Figure 2B:
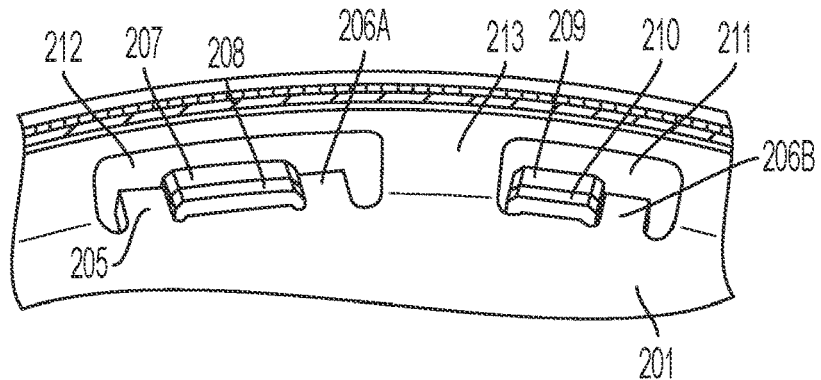
FIG. 2B is a mechanical diagram showing details of a reaction plate in accordance with an embodiment of the disclosure.

Referring to FIG. 2B, a mechanical diagram showing details of a reaction plate in accordance with an embodiment of the disclosure is shown. A section near the periphery of reaction plate 201 is illustrated. The webbing 213 may be curved up from a flat portion of reaction plate 201. Two coupling windows 211 and 212 may be present. First coupling window 212 may be configured with a drive torque transmission tooth 206A and a coast torque transmission tooth 205, while second coupling window 211 may be configured with a single drive torque transmission tooth 206B.

Coupling window 212 may be configured to accommodate a first torque transmission tab 207 coupled to piston 204 (not shown) and a second torque transmission tab 208 coupled to outer clutch plate 202 (not shown). The torque transmission tabs 207 and 208 may fit between the drive torque transmission tooth 206A and the coast torque transmission tooth 205. In drive mode, torque is transferred between the piston 204 and the outer clutch plate 202 via torque transmission tooth 206A by means of torque transmission tabs 207 and 208. In coast mode, torque is transferred between the piston 204 (not shown) and the outer clutch plate 202 (not shown) via torque transmission tooth 205 by means of torque transmission tabs 207 and 208.

Coupling window 211 is configured to accommodate a first torque transmission tab 209 coupled to piston 204 (not shown) and a second torque transmission tab 210 coupled to outer clutch plate 202 (not shown). The torque transmission tabs 209 and 210 fit adjacent to the drive torque transmission tooth 206B. In drive mode, torque is transferred between the piston 204 (not shown) and the outer clutch plate 202 (not shown) via torque transmission tooth 206B by means of torque transmission tabs 209 and 210. In coast mode, no torque is transferred between the piston 204 (not shown) and the outer clutch plate 202 (not shown) in coupling window 211.

Persons skilled in the art will appreciate that first coupling window 212 may be wider than second coupling window 211 to accommodate its two torque transmission teeth 206A and 205. This may increase the area of the webbing 213 strengthening it, as the webbing 213 may be the part of the reaction plate 201 most critical for durability. Such skilled persons will also realize that the pair of torque transmission tabs 207 and 208 may not need to be the same width as the pair of torque transmission tabs 209 and 210, and the widths of the pairs of torque transmission tabs 207, 208, 209 and 210, the widths of the coupling windows 211 and 212, and the widths of torque transmission teeth 205, 206A and 206B are a matter of design choice in any particular embodiment of the invention.

Figure 2C:
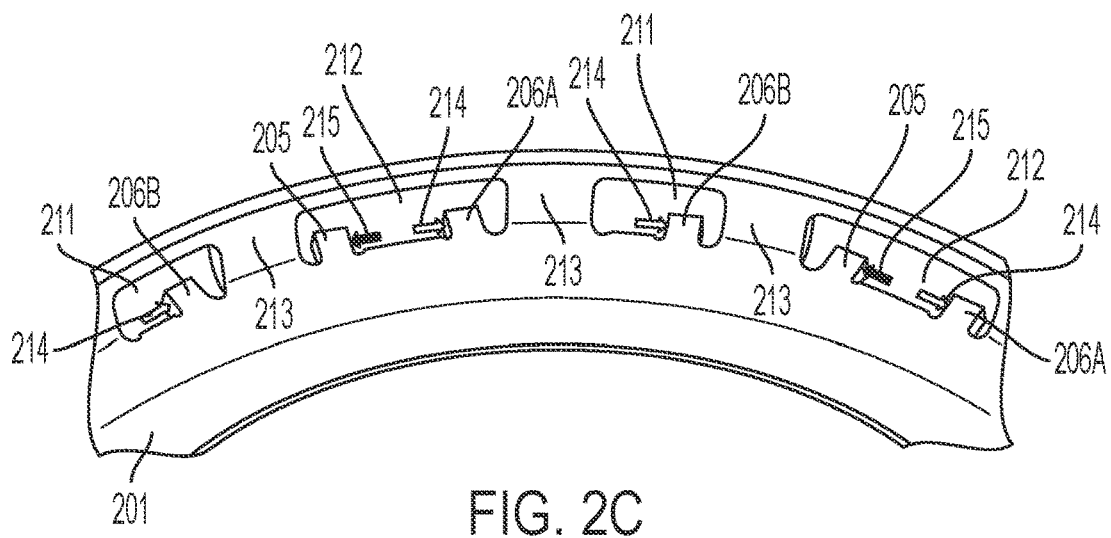
FIG. 2C is a mechanical diagram showing details of a reaction plate in accordance with an embodiment of the disclosure.

Referring to FIG. 2C, a mechanical diagram showing details of a reaction plate in accordance with an embodiment of the disclosure is shown. A section of reaction plate 201 is illustrated. In certain embodiments, substantially a quarter of the periphery of reaction plate 201 is shown. Present in the figure are two instances of first coupling window 212 with its torque transmission tabs 205 and 206A. Also present in the figure are two instances of second coupling window 211 with its single torque transmission tab 206B. In some embodiments, the instances of the coupling windows 211 may be alternating with instances of coupling windows 212, while in other embodiments, different arrangements of the instances of coupling windows 211 and 212 may be used. In various embodiments, the width of the webbing 213 may be substantially the same between the instances of coupling windows 211 and 212, while in various other embodiments, a different arrangement of the segments of webbing 213 may be used.

Also present in the figure are drive torque indicator arrows 214 and coast torque indicator arrows 215. These arrows are illustrative only and are not physically a part of reaction plate 201. Rather, drive torque indicator arrows 214 indicate the direction of torque transmission in drive mode, while coast torque indicator arrows 215 indicate the direction of torque transmission in coast mode, which is opposite the direction of drive mode.

Figure 2D:
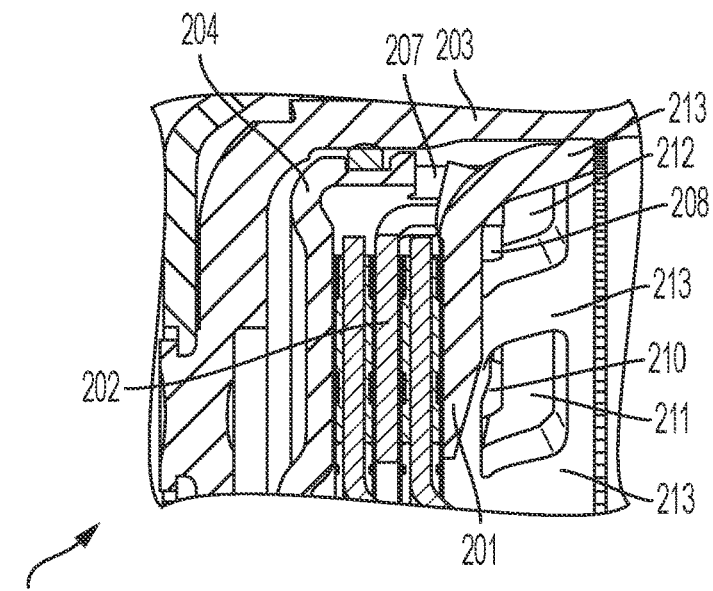
FIG. 2D is a mechanical diagram of torque a converter with a reaction plate in accordance with an embodiment of the disclosure.

Referring to FIG. 2D, a mechanical diagram of torque a converter with a reaction plate in accordance with an embodiment of the disclosure is shown. A portion of torque converter 200 is shown in cross-section and may comprise reaction plate 201, which may be coupled to torque converter cover 203 by means of a laser weld or some similar method. Also illustrated in the figure are piston 204 and outer clutch plate 202. This particular cross-section is through a coupling window labeled 211/212. It is either a first coupling window 212 or a second coupling window 211, though it is impossible to differentiate between them in the figure as the cross-sections for each are the same. Also present in the figure are portions of the webbing 213 in the background, two other coupling windows 211/212 in the background, torque transmission tabs 207/209 coupled to the piston 204, and torque transmission tabs 208/210 coupled to outer clutch plate 202. The torque transmission teeth are obscured from view by the torque transmission tabs 207, 208, 209, and 210 and the webbing 213.

Figure 3:
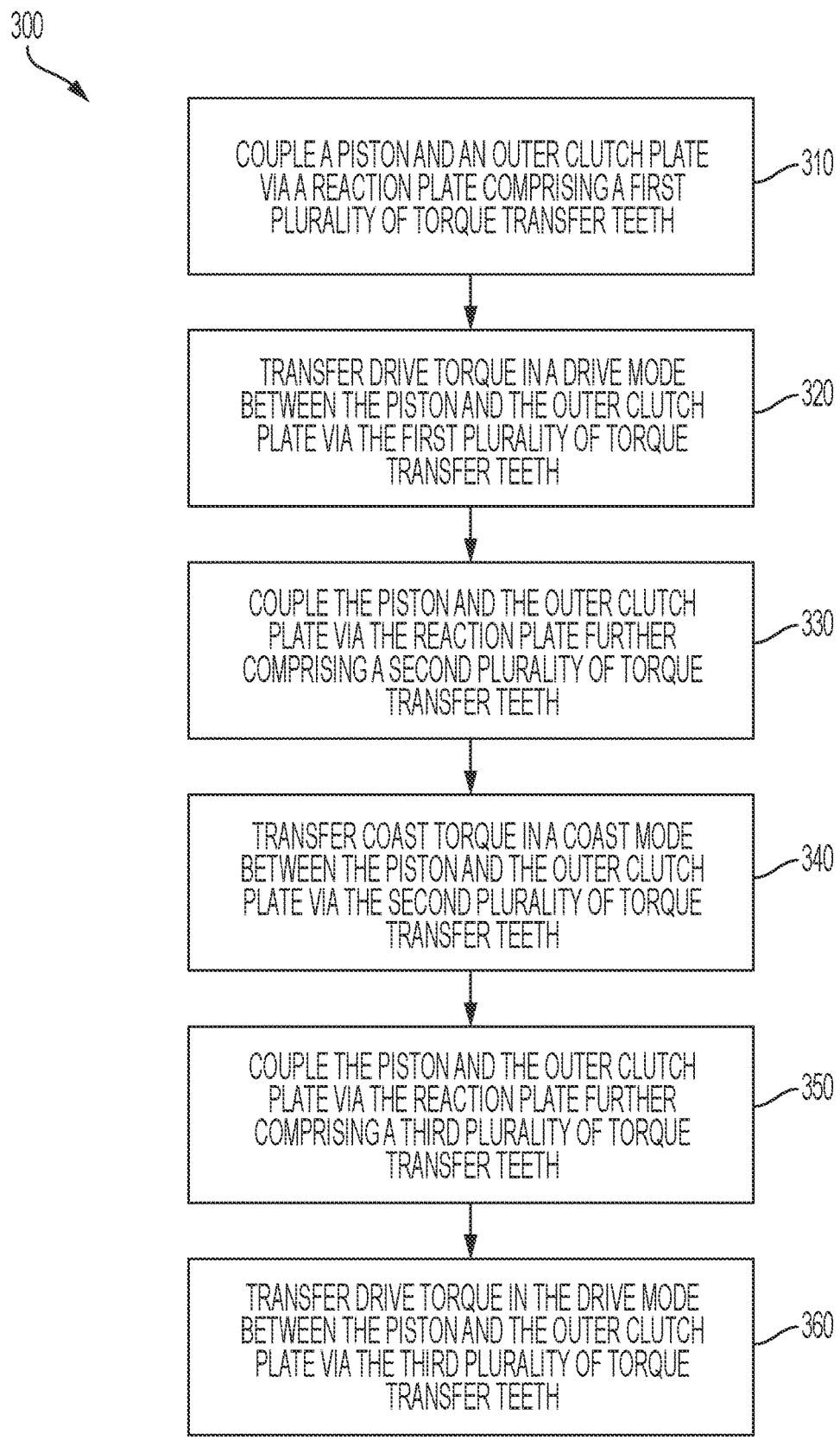
FIG. 3 is a flowchart of a process of operating a torque converter with a reaction plate in accordance with an embodiment of the disclosure.

Referring to FIG. 3, a flowchart of a process 300 of operating a torque converter with a reaction plate in accordance with an embodiment of the disclosure is shown. Process 300 may begin by coupling a piston to an outer clutch plate via a reaction plate by means of a first plurality of torque transfer teeth (block 310). The piston and the outer clutch plate may comprise a first plurality and second plurality, respectively, of torque transmission tabs. These torque transmission tabs may be used to engage with the first plurality of torque transmission teeth to transfer drive torque in a drive mode of operation (block 320).

The piston may also be coupled to the outer clutch plate via the reaction plate, the reaction plate further comprising a second plurality of torque transfer teeth (block 330). The first plurality and second plurality of torque transmission tabs may be used to engage with the second plurality of torque transmission teeth to transfer coast torque in a coast mode of operation (block 340). The reaction plate may further comprise a first plurality of windows for engaging with the first and second pluralities of torque transmission tabs. Each of the first plurality of windows may comprise one of the first plurality of torque transmission teeth and one of the second plurality of torque transmission teeth.

The piston may also comprise a third plurality of torque transmission tabs, and the outer clutch plate may also comprise a fourth plurality of torque transmission tabs. The piston may also be coupled to the outer clutch plate via the reaction plate by means of a third plurality of torque transfer teeth (block 350). The third plurality and fourth plurality of torque transmission tabs may be used to engage with the third plurality of torque transmission teeth to transfer drive torque in a drive mode of operation (block 360). The reaction plate may further comprise a second plurality of windows for engaging with the third and fourth pluralities of torque transmission tabs. Each of the second plurality of windows may comprise one of the third plurality of torque transmission teeth.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

LIST OF REFERENCE NUMBERS

100—automotive drive train
110—engine
111—engine output shaft
120—automatic transmission
121—torque converter
122—intermediate shaft
123—gearbox
124—transmission output shaft
130—drive wheels
200—torque converter
201—reaction plate
202—outer clutch plate
203—torque converter cover
204—piston
205—coast torque transmission tooth
206A—drive torque transmission tooth
206B—drive torque transmission tooth
207—torque transmission tab
208—torque transmission tab
209—torque transmission tab
210—torque transmission tab
211—second coupling window
212—first coupling window
213—webbing
214—drive torque indicator arrow
215—coast torque indicator arrow
300—flowchart of a process of operating a torque converter with a reaction plate
310—flowchart box
320—flowchart box
330—flowchart box
340—flowchart box
350—flowchart box
360—flowchart box

What is claimed is:

1. A torque converter, comprising:
   a piston comprising a first plurality of torque transmission tabs and a second plurality of torque transmission tabs;
   an outer clutch plate comprising a third plurality of torque transmission tabs and a fourth plurality of torque transmission tabs; and
   a reaction plate coupling the piston to the outer clutch plate through the first, the second, the third, and the fourth plurality of torque transmission tabs, wherein:
      the first plurality of torque transmission tabs and the third plurality of torque transmission tabs are coupled together in a first plurality of coupling windows in the reaction plate configured to transmit both a drive torque and a coast torque, and
      the second plurality of torque transmission tabs and the fourth plurality of torque transmission tabs are coupled together in a second plurality of coupling windows in the reaction plate configured to transmit only the drive torque.

2. The torque converter of claim 1, wherein the reaction plate further comprises torque transmission teeth in the first plurality of coupling windows and in the second plurality of coupling windows.

3. The torque converter of claim 2, wherein:
   there is a first torque transmission tooth and a second torque transmission tooth in each of the first plurality of coupling windows, and
   the first plurality of torque transmission tabs are coupled to the third plurality of torque transmission tabs between the first and second torque transmission teeth in each of the first plurality of coupling windows.

4. The torque converter of claim 3, wherein:
   there is a third torque transmission tooth in each of the second plurality of coupling windows, and
   the second plurality of torque transmission tabs are coupled to the fourth plurality of torque transmission tabs adjacent to the third torque transmission tooth in the second plurality of coupling windows.

5. The torque converter of claim 4, wherein:
   the first torque transmission tooth in each of the first plurality of coupling windows is configured to transfer the drive torque,
   the second torque transmission tooth in each of the first plurality of coupling windows is configured to transfer the coast torque and
   the third torque transmission tooth in each of the second plurality of coupling windows is configured to transfer the drive torque.

6. The torque converter of claim 1, wherein:
   each of the first plurality of coupling windows has a first width,
   each of the second plurality of coupling windows has a second width, and
   the first width is greater than the second width.

7. The torque converter of claim 1, wherein:
   each of the first plurality of torque transmission tabs has a third width,
   each of the third plurality of torque transmission tabs has the third width,
   each of the second plurality of torque transmission tabs has a fourth width,
   each of the fourth plurality of torque transmission tabs has the fourth width, and
   the third width is greater than the fourth width.

8. The torque converter of claim 1, wherein the first plurality of coupling windows and the second plurality of coupling windows are arranged symmetrically around a periphery of the reaction plate.

9. The torque converter of claim 1, wherein a number of the first plurality of coupling windows is equal to a number of the second plurality of coupling windows, and
   the first plurality of coupling windows and the second plurality of coupling windows occur in alternate locations around a periphery of the reaction plate.

10. A reaction plate for a torque converter, comprising:
    a main plate area;
    a webbing area at a perimeter of the main plate area, wherein the webbing area is curved out of a plane of the main plate area;
    a first plurality of coupling windows having a first width in the webbing area; and
    a second plurality of coupling windows having a second width in the webbing area.

11. The reaction plate of claim 10, wherein the first width is greater than the second width.

12. The reaction plate of claim 11, wherein:
    the first coupling windows each have a first torque transmission tooth and a second torque transmission tooth; and
    the second coupling windows each have a third torque transmission tooth.

13. The reaction plate of claim 12, wherein:
    the first torque transmission tooth in each of the first plurality of coupling windows is a drive torque transmission tooth configured to transfer torque in a drive direction,
    the second torque transmission tooth in each of the first plurality of coupling windows is a coast torque transmission tooth configured to transfer torque in a coast direction that is opposite of the drive direction, and
    the third torque transmission tooth in each of the second plurality of coupling windows is a drive torque transmission tooth configured to transfer torque in the drive direction.

14. The reaction plate of claim 10, wherein the first plurality of coupling windows and the second plurality of coupling windows are arranged symmetrically around a periphery of the webbing area.

15. The reaction plate of claim 10, wherein a number of the first plurality of coupling windows is equal to a number of the second plurality of coupling windows.

16. The reaction plate of claim 15, wherein the first plurality of coupling windows and the second plurality of coupling windows occur in alternate locations around a periphery of the webbing area.

17. The reaction plate of claim 10, wherein a number of the first plurality of coupling windows is equal to eight and a number of the second plurality of coupling windows is equal to eight.

18. A method of operating a torque converter, comprising:
    transferring drive torque and coast torque between a piston comprising a first plurality of torque transmission tabs and an outer clutch plate comprising a second plurality of torque transmission tabs;
    coupling the first plurality of torque transmission tabs to the second plurality of torque transmission tabs via a first plurality of torque transmission teeth of a reaction plate and a second plurality of torque transmission teeth of the reaction plate;
    transferring only drive torque between the piston further comprising a third plurality of torque transmission tabs and the outer clutch plate further comprising a fourth plurality of torque transmission tabs; and coupling the third plurality of torque transmission tabs to the fourth plurality of torque transmission tabs via a third plurality of torque transmission teeth of the reaction plate.

19. The method of claim 18, wherein:

the reaction plate comprises a first plurality of coupling windows configured to transfer torque between the first plurality of torque transmission tabs and the second plurality of transmission tabs, the first plurality of coupling windows each comprise one of the first plurality of transmission teeth and one of the second plurality of transmission teeth, the reaction plate further comprises a second plurality of coupling windows configured to transfer torque between the third plurality of torque transmission tabs and the fourth plurality of transmission tabs, and the second plurality of coupling windows each comprises one of the third plurality of transmission teeth.

20. The method of claim 19, wherein:

drive torque is transmitted between the piston and the outer clutch plate via the first plurality of transmission teeth, coast torque is transmitted between the piston and the outer clutch plate via the second plurality of transmission teeth, and drive torque is transmitted between the piston and the outer clutch plate via the third plurality of transmission teeth.

\* \* \* \* \*